Figure 1:
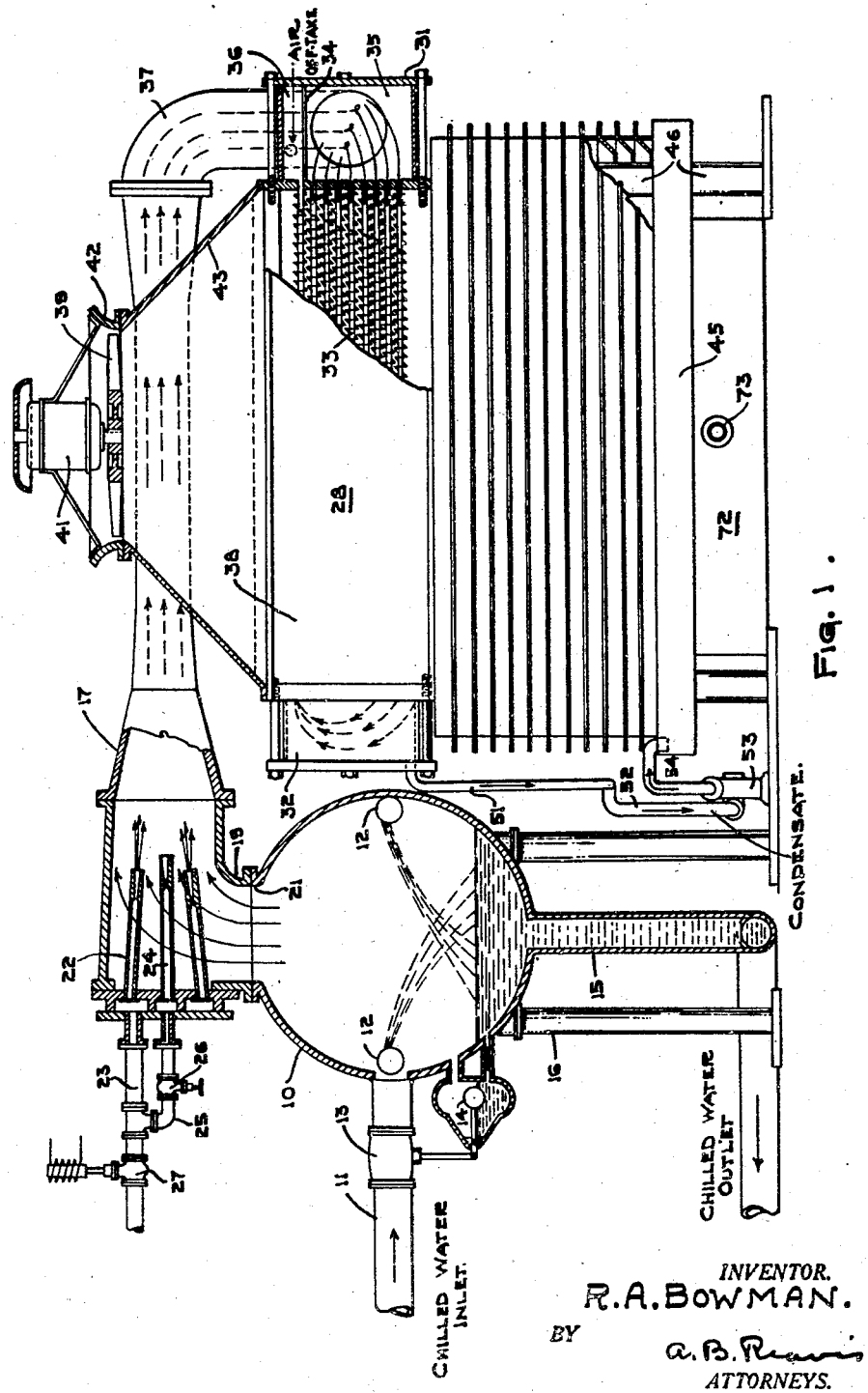

Dec. 16, 1941.   R. A. BOWMAN   2,266,406
EVAPORATIVE CONDENSER APPARATUS
Original Filed July 23, 1936   2 Sheets-Sheet 1

INVENTOR.
R. A. BOWMAN.
BY
a. B. Reavis
ATTORNEYS.

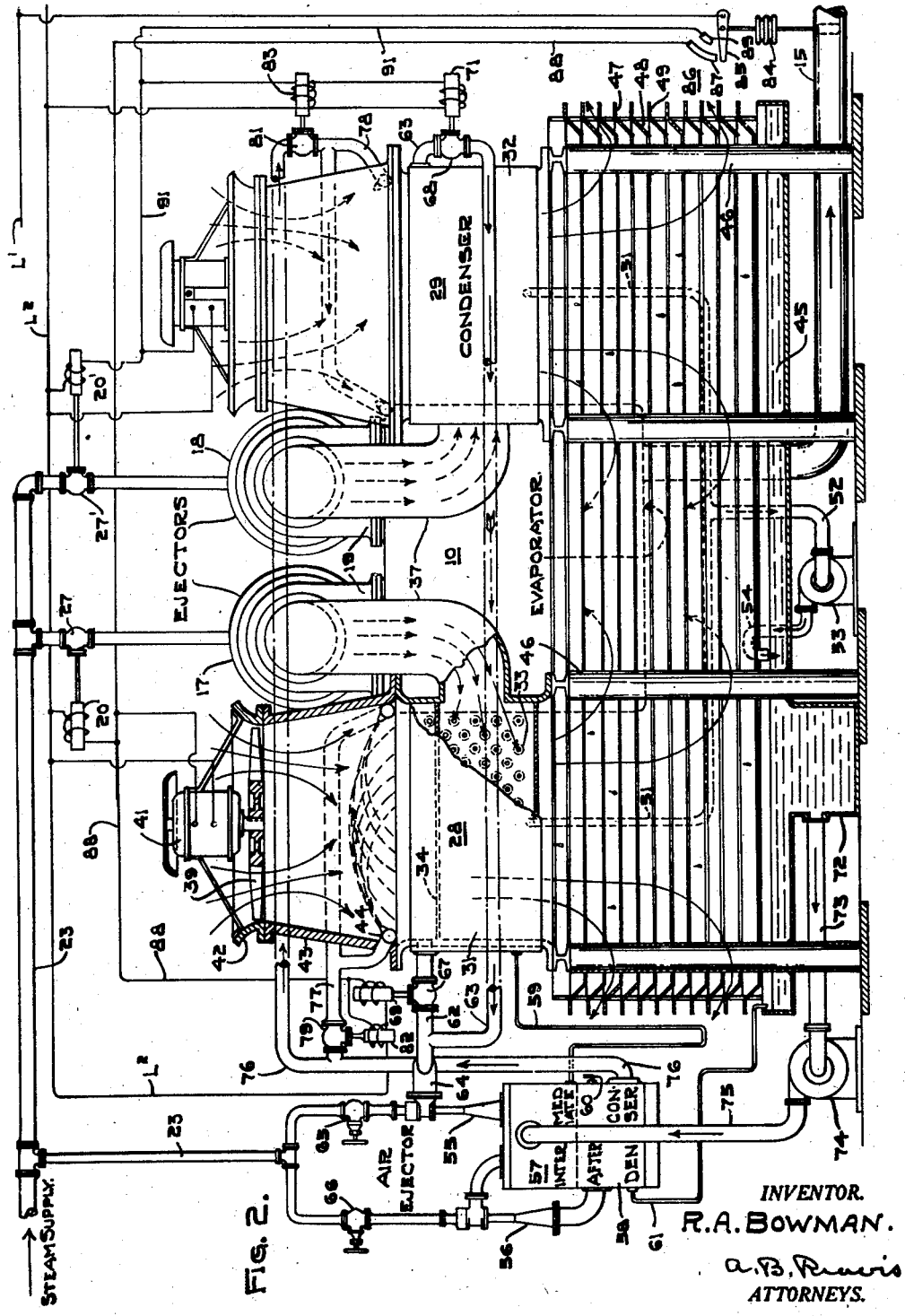

Patented Dec. 16, 1941

2,266,406

UNITED STATES PATENT OFFICE 2,266,406

EVAPORATIVE CONDENSER APPARATUS

Robert A. Bowman, Prospect Park, Pa., assignor to Westinghouse Electric & Manufacturing Company, East Pittsburgh, Pa., a corporation of Pennsylvania Original application July 23, 1936, Serial No. 92,089. Divided and this application January 26, 1938, Serial No. 186,929

3 Claims. (Cl. 257—70)

This application is a division of my application Serial No. 92,089, filed July 23, 1936, which became Patent No. 2,170,802, issued August 29, 1939.

My invention relates to evaporative condenser apparatus, and it has for an object to provide improved apparatus of the character set forth.

A further object is to provide condenser apparatus that may be manufactured in standard units.

Another object is to vary the amount of condenser capacity in operation in accordance with the load on the apparatus served by the condenser apparatus.

According to the present invention, one or more condensers are disposed above a common drip pan in spaced relation thereto, a common louver structure is disposed about the space thus provided, and air is circulated downwardly over the condensers and then horizontally outwardly through said space and said louver structure.

A further feature of the invention comprises a steam motivated air ejector for the condenser, a water cooled condenser therefor, and means for circulating the spray water through the condenser for the air ejector before spraying the same onto the evaporative condenser.

These and other objects are effected by my invention as will be apparent from the following description and claims taken in connection with the accompanying drawings, diagrammatically illustrating the invention and forming a part of this application, in which:

Fig. 1 is a side elevation, partly in section, of apparatus in accordance with my invention; and, Fig. 2 is an end elevation, partly in section, as seen from the right of Fig. 1.

In the form shown on the drawings, I have illustrated my invention as embodied in steam jet refrigerating apparatus. The latter includes an evaporator 10 in which cooling of water is effected by partial evaporation thereof under reduced pressure. The water to be cooled is conveyed to the evaporator 10 through a conduit 11 and sprayed therein by any suitable means, such as by slotted conduits 12. A valve 13 in the conduit 11, actuated by a float 14 in response to the level of water in the evaporator 10, controls the admission of water to be cooled. The cooled water is conveyed to the point of use through a conduit 15 connected to the bottom of the evaporator 10, a suitable pump (not shown) being provided. In the present embodiment, the evaporator 10 is preferably supported at a somewhat elevated position, as by means of columns or posts 16.

A plurality of ejectors, such as the ejectors 17 and 18, are provided for removing the vapor from the evaporator 10. Each ejector has its suction inlet 19 connected to a vapor outlet 21 at the top of the evaporator. Each ejector comprises nozzles 22 supplied with motive steam from a conduit 23. It may also have a starting nozzle 24 supplied with steam from the conduit 23 through a branch conduit 25 and a valve 26. A valve 27, provided in the conduit 23, is adapted to control the flow of steam to both sets of nozzles of the ejector 17, and a similar valve 27' is provided for the ejector 18. When the starting nozzle 24 is employed automatic control mechanism for operating the valve 26 in starting operation of the ejector, as described and claimed in Patent 2,033,844 of D. W. R. Morgan and J. W. McNulty is preferably provided. Inasmuch as such starting nozzle and the control therefor are not an essential part of the present invention, the control therefor is not described herein.

Each ejector is provided with a separate condenser or condenser element for condensing the exhaust fluid therefrom, the condensers for the ejectors 17 and 18 being indicated at 28 and 29, respectively. Each condenser comprises heads 31 and 32 and a bank of tubes 33 connected thereto and extending therebetween. The tubes are preferably provided with fins or extended heat transfer surfaces on the exterior thereof. The tube bank preferably comprises a plurality of superimposed horizontal rows of tubes, and the tubes of adjacent rows may be arranged in offset or staggered relation as shown in Fig. 2. The head 31 is provided with a horizontal partition 34, disposed just below the uppermost row of tubes and dividing the head 31 into an inlet chamber 35 and an outlet chamber 36, the inlet chamber 35 being connected to the outlet of the ejector through a suitable conduit 37. The tubes connected to the outlet chamber 36 constitute air cooler tubes serving to cool or de-vaporize the air and non-condensable gases discharged from the lower tubes into the head 32, while the tubes connected to the inlet chamber 35 serve primarily to condense steam. It will be apparent that the partition 34 may be formed or disposed so as to connect any desired number of air cooling tubes to the outlet chamber 36. Suitable air removal apparatus described below is connected to each outlet chamber 36. Vertical side walls 38 are preferably provided on each side of the tube bank between the heads 31 and 32 to form a casing or passage for vertical flow of air therethrough over the condenser tubes.

In accordance with the present invention, the condensers are cooled by evaporative cooling; that is, water is sprayed onto the outer surfaces of the tubes and a stream of air passed over the wetted surfaces to effect cooling by evaporation of water in the air stream. Each condenser is provided with suitable air translating apparatus, for example, a propeller fan 39 driven by an electric motor 41. The fan is disposed above the tube bank and effects a downward flow of air over the condenser tubes. A fan housing 42 encompasses the propeller fan 39, and a diverging duct member or fitting 43 serves to convey and distribute the air from the fan to the tube bank.

A series of spray nozzles 44 is disposed along each side of the tube bank at the top thereof, and arranged to distribute a spray of water over the top of the tube bank. While the water sprays are directed more or less transversely of the downward stream of air, in order to distribute the spray over the top of the tube bank, the general direction of flow of the spray water over the surfaces of the tubes is downwardly, in the same direction as the flow of air. I find that such an arrangement is highly advantageous in reducing resistance to flow of air, particularly as compared with an arrangement in which the water sprays are directed in a direction opposite to the flow of air.

In order to provide for the collection of unevaporated spray water, I provide a drip pan 45, preferably common to and extending under the full horizontal extent of both the condensers including the space between the two condensers. To provide for the discharge of air and to give the water particles an opportunity to be separated from the discharged air stream, I preferably mount the condensers in a somewhat elevated position by means of columns 46. The drip pan 45 is formed with openings through which the columns extend, and the edges of the openings are welded to the columns to prevent leakage of water and to support the drip pan on the columns. The space between the bottom of the condensers and the drip pan is enclosed by a louvered structure 47, also common to the two condensers. This structure comprises horizontally-extending louvers each having an outwardly inclined portion 48 and a horizontal portion 49, and arranged to form four vertical louvered walls providing a rectangular enclosure about said space.

The condenser tubes 33 are preferably inclined upwardly to the right, as seen in Fig. 1, causing the condensate to drain by gravity into the head 32. From the latter, the condensate from each condenser is drained by gravity first through a branch conduit 51 and then through a common conduit 52 to a pump 53. From the latter, the water is conveyed from a conduit 54 into the drip pan 45. The branch conduits 51 extend downwardly, a sufficient distance before they are joined to provide a loop or hydrostatic seal therebetween when one condenser is in operation and the other is not.

The outlet chambers 36 of the condensers 28 and 39 are connected to suitable air removal apparatus through branch conduits 62 and 63 and a common conduit 64. Valves 67 and 68 are connected in the branch conduits 62 and 63 and are actuated by solenoids 69 and 71, respectively.

The air removal apparatus preferably comprises a first stage air ejector 55 and a second stage air ejector 56. An intermediate condenser 57 is connected to the outlet of the ejector 55, the condensate from said condenser being drained into the head 32 of one of the condensers by means of a conduit 59 arranged in the form of a seal, while the uncondensed fluid is withdrawn by the second stage ejector 56. An after condenser 58 is connected to the outlet of the latter, the condensate formed therein being drained by gravity through a conduit 61 to the drip pan 45, while the uncondensed fluid is vented to the atmosphere through a vent 60.

The ejectors 55 and 56 are supplied with steam from the conduit 23, valves 65 and 66 being provided for the respective ejectors. These valves may well be manually controlled, since it is desirable to maintain the air removal apparatus in continuous operation, even though operation of the main ejectors may be intermittent. However, it will be apparent that the valves may be automatically controlled so as to be in operation only at such time as at least one condenser is in operation.

The drip pan 45 is provided with a sump tank 72, to which a conduit 73 is connected for removing the unevaporated spray water, together with the condensate collected therein, to be redelivered to the sprays 44. The conduit 73 is connected to the inlet of pump 74, which discharges the same into a conduit 75. One feature of the present invention resides in the use of the unevaporated spray water, which has been cooled substantially to the wet bulb temperature of air circulated over the condensers, as circulating water in the intermediate and after condensers. Accordingly, the conduit 75 is connected to the intermediate condenser 57, and the unevaporated spray water is circulated first through the intermediate condenser 57 and then through the after condenser 58. From the latter, it is conveyed through a conduit 76 and branch conduits 77 and 78 connected to the spray nozzles 44 of the condensers 28 and 29, respectively. The branch conduits 77 and 78 are provided with valves 79 and 81, provided with solenoids 82 and 83, respectively.

A control system for automatic operation of the above described apparatus is preferably provided. I preferably design the control system so as to effect admission of steam to the ejector, operation of the air fan, delivery of water to the spray nozzles, and communication with the air removal apparatus simultaneously with the operation of each ejector. In the drawings, I show a preferred form of electrical control supplied with current from line conductors L—1 and L—2. The control includes a thermostat 84 responsive to the temperature of the cooled or chilled water discharged from the apparatus through the conduit 15 and connected to the movable arm 85 of a switch mechanism 86. The latter includes a contact 87 connected to a conductor 88 for controlling the ejector 17 and its auxiliaries, and a contact 89 connected to a conductor 91 for controlling the ejector 18 and its auxiliaries. The arm 85, which is connected to the line conductor L—1 is arranged to engage the contacts 87 and 89 successively upon successive predetermined increases in the temperature of the chilled water. The solenoids 26, 69, and 82 and the fan motor 41 associated with the ejector 18 are controlled by the conductor 88, preferably having one terminal connected to the conductor 88 and the other terminal connected to the line conductor L—2. Similarly, the solenoids and the fan motor associated with the ejector 18 are preferably connected in parallel between the conductor 91 and the line conductor L—2 so as to be simultaneously energized upon energization of the conductor 91.

*Operation*

The operation of the above-described apparatus is as follows: To initiate operation of the refrigerating apparatus, operation of the condensate pump 53, the circulating water pump 74, the air ejectors 55 and 56, and circulation of the chilled water are first initiated. Assuming a maximum refrigerating demand, this is represented by a sufficiently high temperature of the chilled water to cause the switch arm 85 to be moved by the thermostat 84 to engage both contacts 87 and 89, thereby energizing circuits 88 and 91 to effect operation of both ejectors.

Both valves 27—27' (and the valves 26) are opened to supply steam for operation of the ejectors 17 and 18. The ejectors 17 and 18 withdraw vapor from the evaporator 10 and discharge the same, together with the motivating steam, into the condensers 28 and 29, respectively. The removal of vapor from the evaporator 10 effects a reduction in pressure therein, whereupon a portion of the water circulated therethrough vaporizes and is cooled. The steam discharged from each ejector passes through the inlet chamber 35 of the associated condenser into the condensing tubes connected to said inlet chamber, in which tubes the major portion of the steam is condensed. The air and non-condensable vapors then flow, from the head 32, through the tubes in the uppermost row, in which they are cooled and partly devaporized to the outlet chamber 36, from which they are conveyed through the connecting conduits to the air removal apparatus. The condensate from the condensers is drained from the heads 32 through the conduits 51 and 52 to the condensate pump 53, from which it is discharged through the conduit 54 into the drip pan 45.

The fan 39 of each condenser effects downward flow of air through the vertical passage formed by the heads 31 and 32 and the side walls 38 and over the surfaces of the tubes 33. It first passes over the uppermost row of tubes serving as air cooler tubes, so as to effect the lowest temperature of the air and non-condensable vapors. The nozzles 44 direct sprays of water onto the top of the tube bank, which water is carried down with the air stream. The water wets the air cooled surfaces of the tubes, so that evaporative cooling of the tubes is effected; that is, the latent heat abstracted from the steam within the tubes is largely used as latent heat to vaporize water on the exterior surfaces of the tubes, the water vapor being carried away with the air stream. The air then flows downwardly from the tube bank into the space enclosed by the louvered structure 47, and then passes horizontally outwardly between the louvers. The unevaporated particles of water that are carried downwardly by the air stream are collected in the drip pan 45, and the louvers assist in separating the smaller particles which would otherwise be carried away by the air stream.

The unevaporated spray water collected by the drip pan 45 is removed from the sump 72 thereof and conveyed through the conduit 73 to the pump 74, from which it is discharged into the conduit 75. The latter conveys the water to the intermediate condenser 57, through which it flows and effects condensation of the steam and vapor discharged from the first stage ejector 55. It then flows through the after condenser 58, in which it effects condensation of the steam and vapor discharged from the ejector 56. Its temperature having been increased by the absorption of heat, the water is conveyed from the after condenser through the conduit 76 and the branch conduits 77 and 78 to the spray nozzles 44, from which it is re-sprayed. As the water passes through the air stream, the heat removed from the intermediate and after condensers is dissipated by partial evaporation of the water in the air stream, the temperature of the water being rapidly reduced to that of the wet bulb temperature of the air. The water then again serves to provide evaporative cooling as above described.

When the cooling load drops to a point such that the operation of one ejector is sufficient to provide the desired temperature, the temperature of the chilled water leaving the conduit 15 decrease, whereupon the switch arm 85 is moved downwardly to disengage the contact 89, deenergizing the conductor 91. The ejector 18 and its condenser 29 are thereby shut down, the fan motor 41, and the solenoids 29', 71 and 83, being deenergized to shut off the flow of steam to the ejector, the flow of water to the spray nozzles 44 and the communication with the air removal means. The admission of steam to the ejector 17 and the operation of its auxiliaries are continued so that the ejector 17 and the condenser 28 continue to operate in the same manner as before. In this case, the air leaving the condenser 28 may move outwardly through the entire louvered structure 47 so that the velocity thereof may be somewhat reduced. Inasmuch as the ejectors are provided with separate condensers, the shutting down of the ejector 18 will not result in back flow of vapor from the condenser into the evaporator 10, except a momentary flow incidental to equalization of pressure between the evaporator 10 and the condenser 29. This arrangement eliminates the necessity of a valve between the evaporator and the suction inlet of each ejector.

Upon further decrease in cooling load and drop in the temperature of the chilled water in the conduit 15, the switch arm 85 disengages the contacts 87, thereby deenergizing the conductor 88. The flow of steam to the ejector 17 and the operation of its auxiliaries is then shut down, thereby terminating removal of vapor from the evaporator 10. In the illustrated embodiment, the air removal apparatus continues to operate during intermittent operation of the ejectors, in order that vacuum for air removal may be maintained. It is to be understood, however, that any suitable control for the air removal means, known in the art, may be provided.

Upon increase in chilled water temperature, the arm 85 is moved upwardly by the thermostat 84 first into engagement with the contact 87, thereby again initiating operation of the ejector 17 and its auxiliaries in the manner above described. Upon further increase in temperature of the chilled water, due to further increase in load, the arm 85 is moved into engagement with the contact 89 thereby starting operation of the ejector 18 and its auxiliaries.

While I have shown my invention in but one form, it will be obvious to those skilled in the art that it is not so limited, but is susceptible of various changes and modifications, without departing from the spirit thereof, and I desire, therefore, that only such limitations are placed thereupon as are imposed by the prior art or as are specifically set forth in the appended claims.

What I claim is:

1. In an evaporative condenser, the combination of a bank of horizontal tubes, headers connected to the opposite ends of said tubes, vertical side walls extending between said headers to provide therewith a vertical passage for air over the surfaces of said tubes, means for spraying water onto the top of the tube bank, air translating means disposed above the tube bank for effecting forced circulation of air downwardly through said passage, a drip pan disposed beneath the tube bank in spaced relation thereto, and a lower structure extending substantially about the space between the bottom of the tube bank and the drip pan and formed to permit the ready escape of air to the surrounding atmosphere and to retard the escape of water.

2. In an evaporative condenser, the combination of a bank of horizontal tubes, means forming an enclosure about said bank of tubes and a vertical passage for air flowing over the surfaces of said tubes, means for distributing water to the tubes at the top of the tube bank, air circulating means having its outlet connected to the upper end of said vertical passage above the tube bank for effecting forced circulation of air downwardly through said passage, a drip pan disposed beneath the tube bank in spaced relation thereto, and a louver structure extending substantially about the space between the bottom of the tube bank and the drip pan and formed to permit the ready escape of air to the surrounding atmosphere and to retard the escape of water.

3. In evaporative condenser apparatus, the combination of a plurality of condensers disposed adjacent each other, means for spraying water onto the surfaces of said condensers, a drip pan disposed beneath both of said condensers in spaced relation thereto, a common louver structure extending substantially about the space between the condensers and the drip pan and formed to permit the ready escape of air to the surrounding atmosphere and to retard the escape of water, and means associated with each condenser for effecting flow of a stream of air downwardly over the surfaces of the associated condenser into the louver-enclosed space between the condensers and the drip pan and then outwardly through said louver structure.

ROBERT A. BOWMAN.

CERTIFICATE OF CORRECTION.

Patent No. 2,266,406. December 16, 1941.

ROBERT A. BOWMAN.

It is hereby certified that error appears in the printed specification of the above numbered patent requiring correction as follows: Page 2, first column, line 69, for "39" read --29--; page 4, first column, line 12, claim 1, for "lower" read --louver--; and that the said Letters Patent should be read with this correction therein that the same may conform to the record of the case in the Patent Office.

Signed and sealed this 10th day of March, A. D. 1942.

(Seal)

Henry Van Arsdale,
Acting Commissioner of Patents.